No. 12,122. REISSUED JUNE 16, 1903.
W. W. COREY.
FIRE HYDRANT.
APPLICATION FILED OCT. 24, 1902.
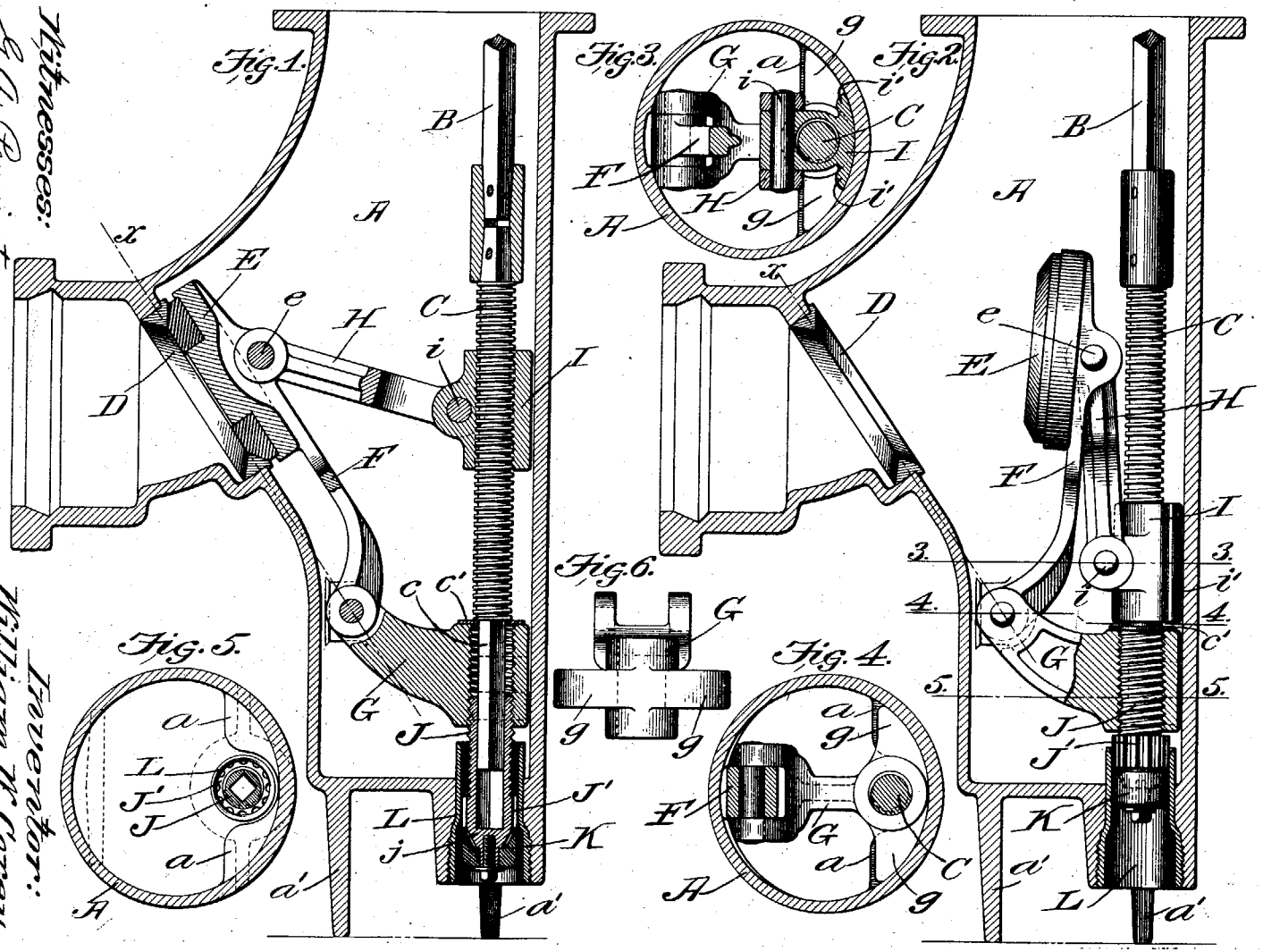
Witnesses:
G. A. Pennington
Ralph Kalish
Inventor:
William W. Corey,
by Bakewell & Cornwall
Attys.

No. 12,122.

Reissued June 16, 1903.

UNITED STATES PATENT OFFICE.

WILLIAM W. COREY, OF ST. LOUIS, MISSOURI.

FIRE-HYDRANT.

SPECIFICATION forming part of Reissued Letters Patent No. 12,122, dated June 16, 1903.

Original No. 678,545, dated July 16, 1901. Application for reissue filed October 24, 1902. Serial No. 128,672.

DIVISION A.

*To all whom it may concern:*

Be it known that I, WILLIAM W. COREY, a citizen of the United States, residing at St. Louis, Missouri, have invented a certain new and useful Improvement in Fire-Hydrants, of which the following is a full, clear, and exact description, such as will enable others skilled in the art to which it appertains to make and use the same, reference being had to the accompanying drawings, forming part of this specification, in which—

Figure 1 is a vertical sectional view through my improved fire-hydrant, showing the valve in its closed position. Fig. 2 is a similar view showing the valve in its open position. Fig. 3 is a cross-sectional view on line 3 3 of Fig. 2. Fig. 4 is a cross-sectional view on line 4 4 of Fig. 2. Fig. 5 is a cross-sectional view on line 5 5 of Fig. 2, and Fig. 6 is a rear elevational view of a hinge-bracket.

This invention relates to a new and useful improvement in fire-hydrants, one object being to construct a device of the character described which can be inserted and removed through the top of the stand-pipe without taking said stand-pipe from the ground; also, to permit an unobstructed flow of water through the barrel of the hydrant and to reduce the water-ram action in the closing of the main valve, the parts being so combined and arranged that the main valve is operated by a positive and powerful mechanism.

Another object of my invention is to simplify the construction and arrangement of the valve-operating mechanism.

With these objects in view the invention consists in the construction, arrangement, and combination of the several parts, all as will hereinafter be described, and afterward pointed out in the claims.

In the drawings, A indicates the stand-pipe, which may be composed of two or more sections, the upper part of which is of any ordinary or approved construction—that is, provided with a cap and squared shank on the valve-operating rod B, whereby the latter may be rotated to operate the valve. This rod B is preferably squared and has a threaded section C coupled to its lower end by a suitable coupling. This threaded section C is provided with a non-circular portion *c* at its lower end, the purpose of which will hereinafter be described.

D indicates the seat-ring in the stand-pipe, which seat-ring is preferably inclined and located to one side of the stand-pipe and in the branch which connects with the water-main. By inclining the seat-ring as shown the water is directed upwardly when it enters the stand-pipe, as will be obvious. So far as I am aware this arrangement of the seat-ring is new and has the advantage in so directing the water upwardly of reducing frictional loss to a greater extent than is possible where the valve-seats are placed at right angles to the barrel or stand-pipe, as is ordinarily done.

E indicates a valve for coöperating with the ring-seat D, said valve having the usual conical face and being provided upon its back with lugs for receiving the pivot-bolt *e*. Depending from this valve is an extension F, said extension being pivotally mounted upon a bracket G, arranged upon the valve-rod and supported by shoulders *a*, projecting inwardly from a point near the lower end of the stand-pipe. Referring to Figs. 1 and 2, it will be observed that the pivotal point of the valve is on the plane of the valve-seat, the plane of said valve-seat being indicated by the dot-and-dash lines *x*.

H indicates a link whose free end is mounted upon the pivot-bolt *e*, the opposite end of said link being mounted upon a pivot-bolt *i*, carried by a nut I, which is threaded upon the valve-rod C. This nut I, as shown in Fig. 3, is provided with lateral wings *i'* at its back, which bear against the stand-pipe and serve to support the nut in its vertical movement in order that the valve-rod will not be deflected when pressure is being brought to bear upon the valve E to force said valve home to its seat.

By referring to Fig. 3 it will be observed that the link H is bifurcated at one end, said bifurcated end straddling the nut I, so as to enable the pivot-bolt *i* to be arranged close to the threaded valve-rod C.

Assuming that the hinge-bracket G is stationary, it will be obvious that when the valve-rod is rotated in one direction the nut I will be elevated, throwing the valve E in position against its seat, the continued rotation of the rod bringing the pivot-point of link H nearer a position of dead-center.

The facing of valve E is preferably made of rubber, so as to yield and make a permanent seat, and as this facing becomes worn it is obvious that the nut I can be elevated to a position of dead-center to take up the wear in the valve-facing. When the nut I reaches a position wherein the link H is approximately on dead-centers, the coupling at the upper end of the threaded valve-rod C prevents further movement of the nut I in an upward direction and indicates to the operator that the valve needs repacking if leakage occurs when the nut is in such elevated position. Assuming that it is desired to open the valve, the valve-rod is rotated in the reverse direction, causing the nut I to descend until the parts reach the position shown in Fig. 2, wherein the valve is fully open. In this position the valve is out of the path of the water, so as not to retard or impede its free passage in any way, and thus an uninterrupted path for the flow of water is provided. It will be observed that the nut I bears against the rear wall of the stand-pipe in practically all of its positions, so that when the valve is seated home and the link H is under compressive strain such strain is communicated directly to the nut, which nut is seated firmly against the rear wall of the stand-pipe. The valve-operating rod is thus relieved of all lateral strains which would tend to bend or deflect it out of a straight line, said rod being subjected only to torsional stresses in operation and longitudinal stresses when the main valve is home, which latter are taken up by suitable means provided to accommodate such end thrust on the valve-rod. This end thrust when the link H is in a position of dead-center is practically at zero. When said link is in a position such as shown in Fig. 1, wherein the valve E is home and the rubber facing is not compressed, being the position of what I might term the "greatest angle," and consequently the greatest amount of end thrust, it will be observed that this angle is so small relative to the zero position, wherein said link is on dead-centers, that a shoulder formed by the threaded portion of said rod and the squared portion *c* is sufficient to take care of such end thrust. This shoulder bears upon the upper face of the hinge-bracket G, which is supported by the lugs *a*, extending from the back of the stand-pipe. In order to offer a firm bearing for the lower end of valve-rod C, I arrange a washer *c'* between the shoulder above mentioned and the upper face of the hinge-lug, as shown in Fig. 1. This hinge lug or bracket G, as before stated, is provided with wings *g*, (see Figs. 4 and 6,) which rest upon the shoulders *a*. The back of this hinge-lug is preferably curved to conform to the shape of the rear wall of the stand-pipe, against which it snugly fits. The hub portion of the hinge-lug G, through which passes the squared shank *c* of the valve-stem, is provided with screw-threads for coöperating with a threaded stem J of the drain-valve located in the bottom of the stand-pipe. This threaded stem is provided with an opening for receiving the non-circular shank *c*, whereby when the valve-operating rod is rotating the drip-valve stem J will be correspondingly rotated and by reason of its threaded connection with the hinge lug or bracket G will be raised or lowered, depending upon its direction of rotation, the non-circular shank *c* being received in or withdrawn from the bore of the valve-stem J.

J' indicates a head on the lower end of valve-stem J, which head, as shown in Figs. 2 and 5, is provided with grooves to permit the passage of water therebeyond, said head serving as a guiding-spider for the drip-valve.

K indicates the drain-valve proper, which is preferably made up of rubber, leather, or other suitable material, said valve being cup-shaped and fitting upon a projection *j* on the lower end of the drain-valve stem. This drip-valve is so arranged that water may enter in its pocket for the purpose of causing the flanges of said valve to contact with the walls of the valve-casing in which it is mounted for the purpose of making a water-tight joint. The drain-valve is held in position by a suitable screw-bolt and washer, as is well understood.

L indicates a casing for the drain-valve, which is in the form of a thimble or sleeve, the upper end of which opens into the stand-pipe and is of relatively small diameter, corresponding to the diameter of the drain-valve K, while the lower end opens into the exterior and is of relatively large diameter, so as to permit water from the interior of the stand-pipe to pass therearound in its escape. This sleeve L is preferably threaded into an appropriate boss extending from the bottom wall of the stand-pipe. It is well known that the purpose of this drain-valve is to enable the water left in the stand-pipe when the valve E is closed to escape to the exterior, so that in winter the hydrant will not be rendered inoperative by ice. Another object is to provide a vent for the water when the valve E is closed, so that the moving parts will be relatively dry. The legs *a'* shown on the bottom of the stand-pipe are present for the purpose of guarding the drain-valve boss in transportation, &c.

Heretofore the drain-valves used in hydrants of this class have been most generally employed to control lateral openings in the valve-casing; but this form of construction I have found to be objectionable, because the lateral openings will cut the rubber valve and in addition will cause the escaping water to travel a tortuous path. In my present construction the drain-valve merely serves to close an open-ended cylinder, and, as shown in Fig. 1, it will be noticed that as soon as the rod B is rotated and before the main valve has opened to any great extent the upper end of the drain-valve has entered the reduced bore of the casing. Of course the water coming into the stand-pipe will first fill the lower end thereof, and in so doing will pass beyond the grooved head J′ and be received by the cup-shaped drain-valve. The pressure of the water on top of this valve will force its flanges outwardly, so as to make a water-tight joint with the casing, which prevents the water from passing to the exterior. Of course as the valve-rod is operated to open the main valve to its full extent this drain-valve is elevated; but the sleeve L affords plenty of room for such travel of the drain-valve, said drain-valve in all of its positions in the contracted portion of the sleeve making a water-tight joint to prevent the escape of the water in the stand-pipe while the main valve is open, as shown in Fig. 2. When the main valve is closed, as shown in Fig. 1, the drain-valve occupies a position in the enlarged portion of the valve-casing, permitting the water passing through the grooves of the head J′ to find an escape at all points around the drain-valve, the water traveling in a relatively straight path in finding such escape. Where the water can pass to the exterior on all sides of the drain-valve, the stand-pipe will be emptied in a much shorter space of time than would be the case where a series of small openings are arranged in the sleeve L, the drain-valve passing above or below said openings in its control thereof.

I do not in this application claim the construction of this drain-valve *per se*, as the same forms the subject-matter of a companion application filed of even date herewith.

I am aware that many minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. In a fire-hydrant, the combination with a stand-pipe having a branch for connection with a water-main, of an obliquely-arranged valve-seat in the branch of said stand-pipe, the opening in said valve-seat being of less diameter than the interior diameter of the stand-pipe branch, so as to contract the available opening for the flow of water at this point, the connection of the branch to the stand-pipe being such as to enable the obliquely-arranged valve-seat, in conjunction with the connection between the branch and stand pipes, to direct the water upwardly through the stand-pipe, a valve coöperating with said valve-seat, and mechanism in the stand-pipe for positively moving said valve to and from its seat; substantially as described.

2. In a hydrant, the combination with a stand-pipe provided with a valve-seat, of a pivoted valve coöperating with said seat, a threaded valve-operating rod, a bracket in which the lower end of said valve-operating rod is received, said bracket affording a pivotal support for the valve, the axis of rotation of said valve being on the plane of the valve-seat, a nut on the valve-operating rod, and a link connecting the nut and pivoted valve; substantially as described.

3. In a hydrant, the combination with a stand-pipe provided with a valve-seat, of a pivoted valve coöperating with said seat, a threaded valve-operating rod, a bracket in which the lower end of the valve-operating rod is received, and to which the valve is pivoted, a nut on said rod, and a link pivoted to the nut and to the valve, the pivotal point of the link to the valve being located at about the center of the valve proper; substantially as described.

4. In a hydrant, the combination with a stand-pipe provided with a valve-seat, of a valve provided with an extension F, a bracket G in which said extension is pivoted, a threaded rod whose lower end passes through said bracket, means on the lower end of said rod for engaging the bracket and holding the same in a proper position relative to the rod, a nut on said rod, and a link pivotally connected to said nut and to said valve; substantially as described.

5. In a hydrant, the combination with a stand-pipe provided with a valve-seat, of a valve having a yielding face coöperating with said seat, a stationary bracket in which said valve is pivoted, a valve-operating rod, a nut on said rod, a link pivoted to said nut and to said valve, and means for arresting the upward movement of the nut when the link approaches a position of dead-center; substantially as described.

6. In a hydrant, the combination with a stand-pipe provided with lugs *a* extending from the back wall thereof, a bracket G arranged on said lugs, the forward end of said bracket engaging the front wall of the stand-pipe, a valve-operating rod whose lower end is seated in the bracket, a nut on the valve-operating rod, a valve pivotally mounted in said bracket, and a link pivotally connected to said nut and to said valve; substantially as described.

7. In a hydrant, the combination with a stand-pipe provided with a valve-seat, of a valve, a valve-operating rod, a winged nut mounted upon said rod and bearing against the back wall of the stand-pipe, a link pivotally connecting said nut and said valve, and a bracket arranged at the lower end of the valve-operating rod, said bracket bearing against the front and rear walls of the stand-pipe and providing at its front end a pivotal support for the valve; substantially as described.

8. In a hydrant, the combination with a stand-pipe provided with a valve-seat, of a valve, an extension from said valve which is mounted upon a fixed pivot-point, a valve-operating rod having a threaded portion at its lower end, a nut on said threaded portion, a link pivotally connected to said nut and to said valve, and a drip-valve arranged on, and operated by, the valve-operating rod; substantially as described.

9. The combination with a stand-pipe provided with a valve-seat arranged at an angle, of a valve-operating rod, a bracket arranged on the lower end of said rod, means in the lower end of the stand-pipe for coöperating with said bracket and supporting it firmly in position, a valve pivoted in said bracket, the pivotal point of said valve, when the bracket is in position in the stand-pipe, being on the plane of the valve-seat, and means operated by the valve-operating rod and connected to said pivoted valve for moving the latter to and from the seat in the stand-pipe, said rod, bracket, pivoted valve, and its operating mechanism, being connected together so as to permit of their insertion and removal through the top of the stand-pipe; substantially as described.

10. The combination with a threaded valve-operating rod provided with a non-circular portion at its lower end, of a bracket G through which said non-circular portion passes, the bore of said bracket being threaded, a valve pivoted in said bracket, a nut on the valve-operating rod, a link pivotally connected to said nut and said valve, and a drain-valve whose stem receives the non-circular portion of the valve-operating rod and is threaded into the bore of the bracket, whereby all of said parts may be inserted and removed through the top of a stand-pipe; substantially as described.

11. In a hydrant, the combination with a stand-pipe provided with a valve-seat, of a valve coöperating with said valve-seat, a valve-operating rod having a threaded portion at its lower end, a nut on said threaded portion, a link pivotally connecting said nut and valve, the inner end of said link being bifurcated to straddle the nut and enable the placing of the connecting-pin close to the threaded opening of the nut; substantially as described.

12. In a hydrant, the combination with a stand-pipe, of a seat-ring arranged at one side thereof, said seat-ring being inclined so as to direct the water upwardly through the stand-pipe, a valve coöperating with the seat in the ring, and means for moving said valve to and from its seat, said valve, when in its full open position, being located out of the path of the main current of flowing water which is directed upwardly by the seat-ring; substantially as described.

In testimony whereof I hereunto affix my signature, in the presence of two witnesses, this 20th day of October, 1902.

WILLIAM W. COREY.

Witnesses:

GEORGE BAKEWELL,

G. A. PENNINGTON.